(12) United States Patent
Ge

(10) Patent No.: US 11,991,301 B2
(45) Date of Patent: May 21, 2024

(54) HINGE OF MOBILE TERMINAL HAVING FLEXIBLE OUTER SCREEN AND MOBILE TERMINAL HAVING FLEXIBLE OUTER SCREEN

(71) Applicant: Hangzhou Amphenol Phoenix Telecom Parts Co., Ltd., Zhejiang (CN)

(72) Inventor: Lifeng Ge, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 400 days.

(21) Appl. No.: 17/415,936

(22) PCT Filed: Dec. 2, 2019

(86) PCT No.: PCT/CN2019/122400
§ 371 (c)(1),
(2) Date: Jun. 18, 2021

(87) PCT Pub. No.: WO2020/125392
PCT Pub. Date: Jun. 25, 2020

(65) Prior Publication Data
US 2022/0070285 A1 Mar. 3, 2022

(30) Foreign Application Priority Data
Dec. 19, 2018 (CN) .......................... 201811552555.1

(51) Int. Cl.
*H04M 1/02* (2006.01)
(52) U.S. Cl.
CPC ....... *H04M 1/0268* (2013.01); *H04M 1/0216* (2013.01)

(58) Field of Classification Search
CPC .................................................. H04M 1/0268
See application file for complete search history.

(56) References Cited

U.S. PATENT DOCUMENTS

| 9,946,310 B1 | 4/2018 | Huang et al. |
| 2018/0110139 A1 | 4/2018 | Seo et al. |
| 2018/0203487 A1 | 7/2018 | Kee et al. |

FOREIGN PATENT DOCUMENTS

| CN | 108322567 A | 7/2018 |
| CN | 108345358 A | 7/2018 |
| CN | 207782858 U | 8/2018 |
| CN | 108615464 A | 10/2018 |

*Primary Examiner* — Hsinchun Liao
(74) *Attorney, Agent, or Firm* — Muncy, Geissler, Olds & Lowe, P.C.

(57) ABSTRACT

A hinge for a mobile terminal having a flexible outer screen. The mobile terminal has the flexible outer screen, including neutral layer and bottom idle skeleton structures that may be bent and unfolded. The middle part of the neutral layer structure is fixedly connected to the middle part of the middle skeleton structure. Left and right sides of the neutral layer structure are movably connected to the left and right sides of the middle skeleton structure respectively. Flexible components are respectively provided between the left side of the neutral layer structure and the left side of the middle skeleton structure and between the right side of the neutral layer structure and the right side of the middle skeleton structure. The mobile terminal having the flexible screen moves smoothly during screen-flattening and folding operations, supports flattening, and may realize a narrow frame design and longer service life.

14 Claims, 8 Drawing Sheets

HINGE OF MOBILE TERMINAL HAVING FLEXIBLE OUTER SCREEN AND MOBILE TERMINAL HAVING FLEXIBLE OUTER SCREEN

FIELD OF THE INVENTION

The present invention relates to a hinge of a mobile terminal having a flexible outer screen and the mobile terminal having the flexible outer screen.

BACKGROUND

A flexible screen is an emerging screen. Presently, for a flexible screen, it is required to design a hinge that makes the support surface of the flexible screen unchanged or minimally changed when it is bent and unfolded and is easy to use, so that the flexible screen can be commercially applied to mobile terminals such as a mobile phone and a laptop computer, etc.

SUMMARY

The technical problem to be solved by the present invention is to provide a hinge of a mobile terminal having a flexible outer screen, which can be applied to support a flexible screen in a mobile terminal. To achieve this object, the present invention adopts the following technical solutions:

A hinge of a mobile terminal having a flexible outer screen, comprising a neutral layer structure that may be bent and unfolded and a bottom middle skeleton structure that may be bent and unfolded; the middle part of the neutral layer structure is fixedly connected to the middle part of the middle skeleton structure, and left and right sides of the neutral layer structure are movably connected to the left and right sides of the middle skeleton structure respectively; and flexible components are respectively provided between the left side of the neutral layer structure and the left side of the middle skeleton structure and between the right side of the neutral layer structure and the right side of the middle skeleton structure.

On the basis of the foregoing technical solutions, the present invention may further adopt the following technical solutions or a combination of these technical solutions.

The neutral layer structure comprises a middle fixing part, a left connecting structure, and a right connecting structure, a flexible part that is capable of bending and restoration along the bending shape and unfolding shape of the hinge is disposed on the neutral layer structure, the flexible part is connected to the middle fixing part, the left connecting structure and the right connecting structure, and the height of the flexible part in the thickness direction of the hinge is basically the same as the height of the neutral layer of the flexible screen in the thickness direction when the flexible screen is disposed on the hinge.

The flexible components cause the flexible part to be pulled.

The bottom middle skeleton structure comprises a middle support rod, a left auxiliary support rod, and a right auxiliary support rod, one or a plurality of main flexible connecting parts that are capable of bending and restoration along the bending shape and unfolding shape of the hinge are further disposed on the bottom middle skeleton structure, the main flexible connecting part is connected to the middle support rod, the left auxiliary support rod and the right auxiliary support rod; in the thickness direction of the hinge, the position of the main flexible connecting part is lower than the position of the flexible part.

The bottom middle skeleton structure comprises a middle support rod, a left auxiliary support rod, and a right auxiliary support rod, and the middle support rod is fixed with a synchronizing mechanism, two ends of the left auxiliary support rod and the right auxiliary support rod are respectively connected to the left and right ends of the synchronizing mechanism, to make the left auxiliary support rod and the right auxiliary support rod to rotate synchronously and reversely along the left and right axes of the synchronizing mechanism.

The left auxiliary support rod and the right auxiliary support rod are connected to the bottom middle skeleton structure through a guiding device.

There are two left auxiliary support rods and two right auxiliary support rods respectively, the guiding device comprises a first guiding mechanism and a second guiding mechanism, the outer auxiliary support rods of the left auxiliary support rod and the right auxiliary support rod are respectively connected to two ends of the synchronizing mechanism through the respective first guiding mechanism; the two left auxiliary support rods are connected to the middle support rod through the second guiding mechanism thereof, and the two right auxiliary support rods are connected to the middle support rod through the second guiding mechanism thereof.

The left auxiliary support rod and the right auxiliary support rod on the outer side are respectively provided with a non-linear first trajectory at the connecting portions of the ends, the synchronizing mechanism are provided with guide pins on the left and right ends respectively and the guide pins are inserted into the first trajectory groove of the left auxiliary support rod and the right auxiliary support rod for connection and engagement to form a first guiding mechanism; the hinge is provided with a left guide and a right guide at the end of the middle skeleton structure, and the left guide and right guide are hinged with the middle support rod, the left guide and the right guide are respectively provided with trajectory grooves for two left auxiliary support rods and two right auxiliary support rods, and the two left auxiliary support rods and the two right auxiliary support rods are respectively provided with pins on the ends, and the pins are inserted into corresponding trajectory grooves for connection and engagement, to form a second guiding mechanism.

The synchronizing mechanism adopts a gear synchronizing mechanism, and the left gear and the right gear thereof are respectively provided with a connecting arm to connect to the left auxiliary support rod and the right auxiliary support rod.

The left and right sides of the neutral layer structure are linearly and slidingly connected to the left and right sides of the middle skeleton structure.

The neutral layer structure comprises a middle fixing part, a left connecting structure, and a right connecting structure, beams are respectively connected between the left connecting structures and between the right connecting structures at both ends of the hinge, and the flexible component are connected between the beam and the middle skeleton structure; or, near the two ends of the hinge, flexible components are respectively provided between the left side of the neutral layer structure and the left side of the middle skeleton structure and between the right side of the neutral layer structure and the right side of the middle skeleton structure; or, flexible components are respectively provided between the left side of the middle skeleton structure and the left casing of the mobile terminal and between the right side of the middle skeleton structure and the right casing of the mobile terminal.

The left connecting structure and the right connecting structure are respectively provided with connecting portions of the left casing and the right casing of the mobile terminal having a flexible outer screen.

The left connecting structure in the neutral layer structure comprises a first left connecting part and a second left connecting part that are disposed sequentially from the middle to the left side, and the right connecting structure comprises a first right connecting part and a second right connecting part that are disposed sequentially from the middle to the right side; the second left connecting part and the second right connecting part are provided with a connecting portion that is respectively connected to the left casing and the right casing of the mobile terminal, and the second left connecting part and the second right connecting part are further provided with a portion that is slidingly connected to the left and right sides of the middle skeleton structure respectively; the middle fixing part, the first left connecting part, the second left connecting part, and the middle fixing part, the first right connecting part, and the second right connecting part are movably connected sequentially; the two ends of the flexible part are connected to the second left connecting part and the second right connecting part.

The middle fixing part, the first left connecting part, the second left connecting part, the first right connecting part, and the second right connecting part are respectively provided with a groove or a hole to pass through the flexible part.

The present invention further provides a mobile terminal having a flexible outer screen, the mobile terminal is provided with any one of the above hinge, and the left casing and the right casing of the mobile terminal having a flexible outer screen are respectively connected to the left and right sides of the neutral layer structure of the hinge.

By adopting the above technical solutions, the hinge of a mobile terminal having a flexible outer screen provided in the present invention may be applied to mobile terminals such as a mobile phone and a laptop computer. The applied mobile terminal having the flexible screen moves smoothly during flexible screen-flattening and flexible screen-folding operations, supports the flattening, and may easily realize a narrow frame design and a longer service life.

DETAILED DESCRIPTION

Figure 1:
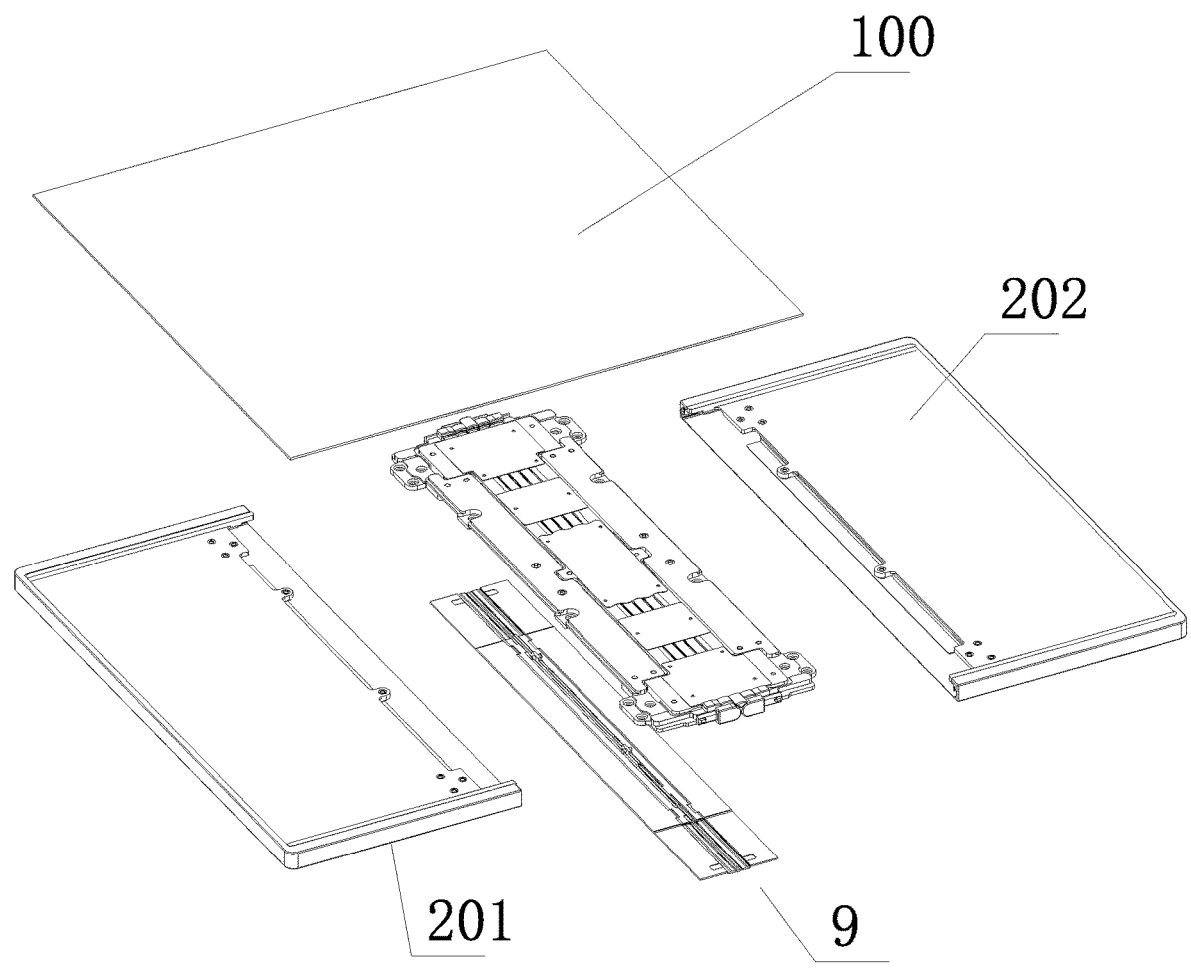
FIG. 1 is an exploded view of a hinge of the present invention applied to an embodiment of a mobile terminal having a flexible outer screen.
Figure 2:
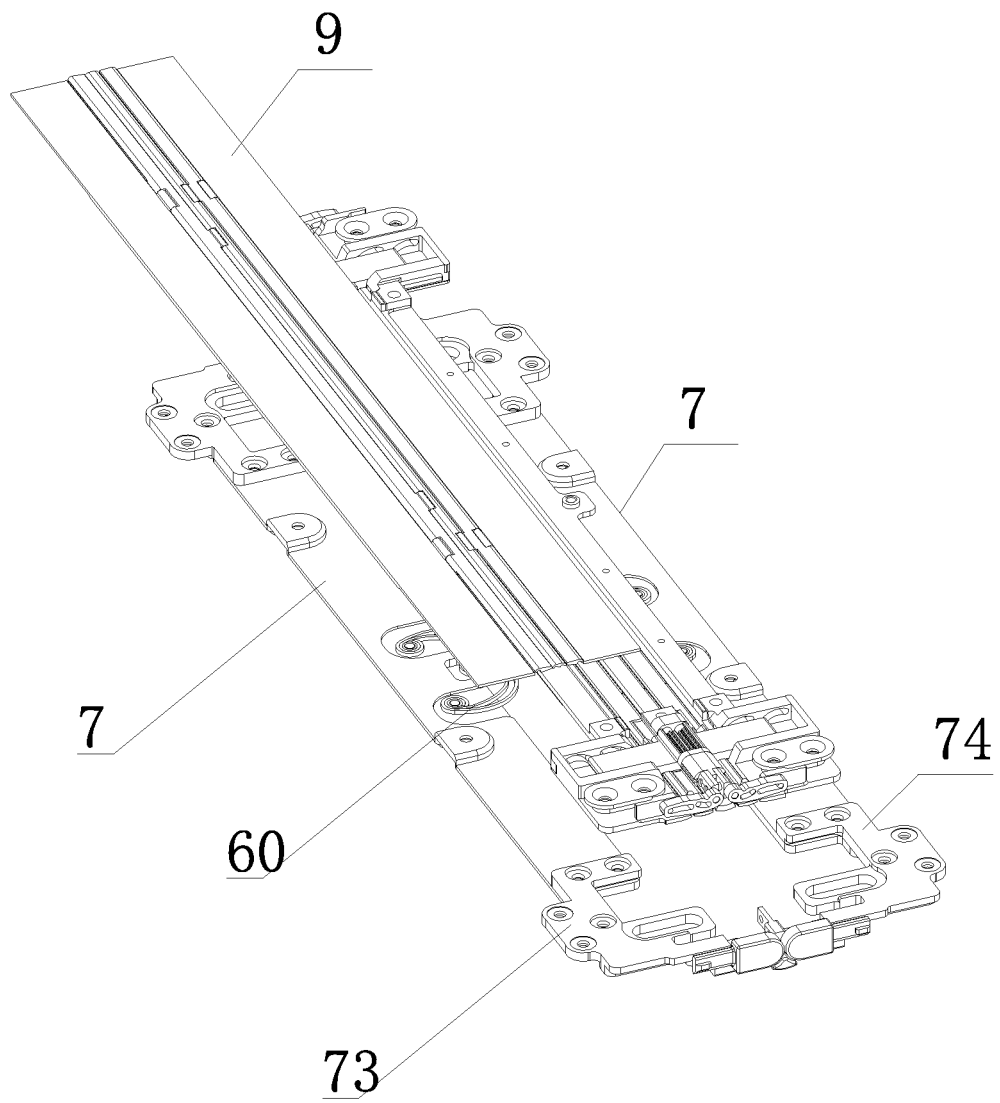
FIG. 2 is an exploded view of a hinge of the present invention.
Figure 3A:
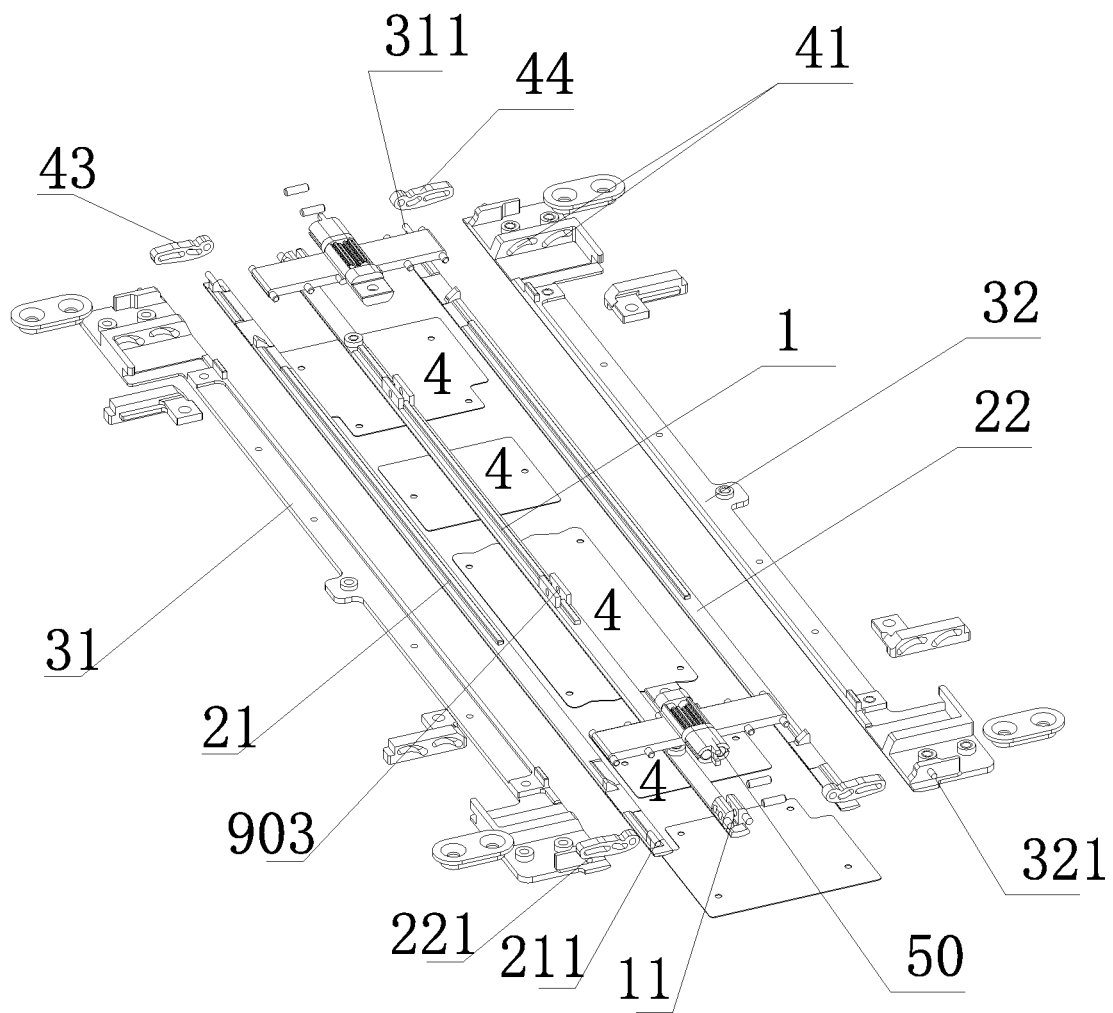
FIG. 3a is an exploded view of a middle skeleton structure of the hinge shown in FIG. 2.
Figure 3B:
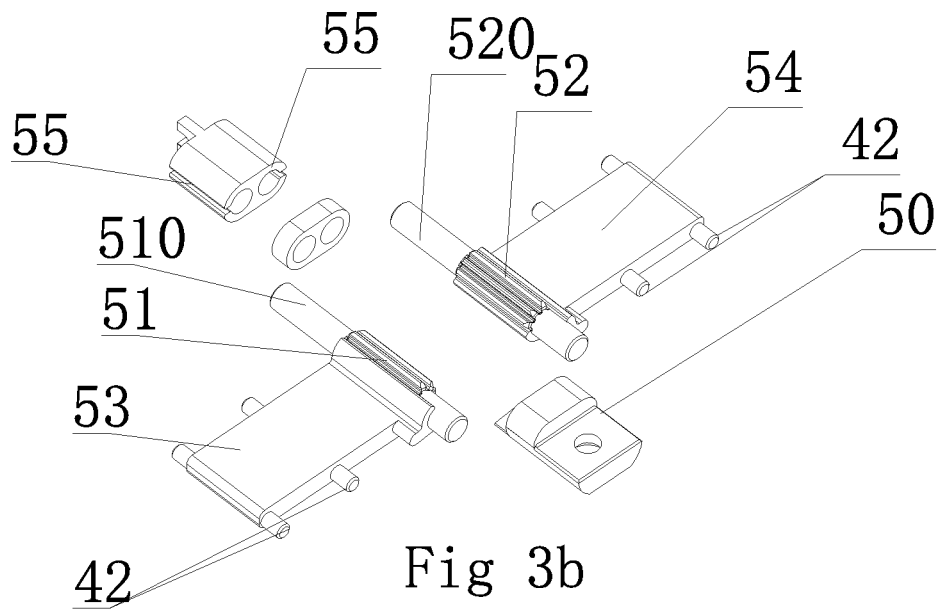
FIG. 3b is an exploded view of a synchronizing mechanism of the hinge shown in FIG. 2.
Figure 3C:
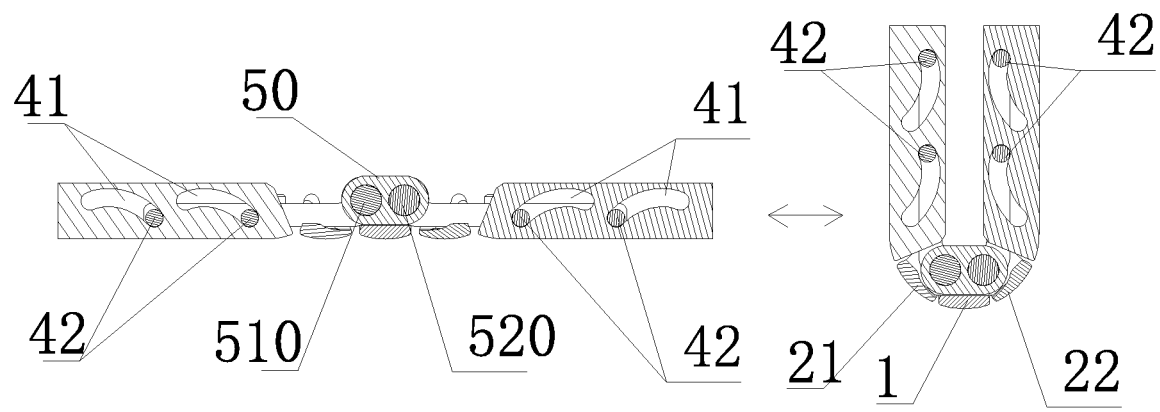
FIG. 3c is a working schematic diagram of a first guiding mechanism of the hinge shown in FIG. 2 when the hinge is bent and flattened.
Figure 3D:
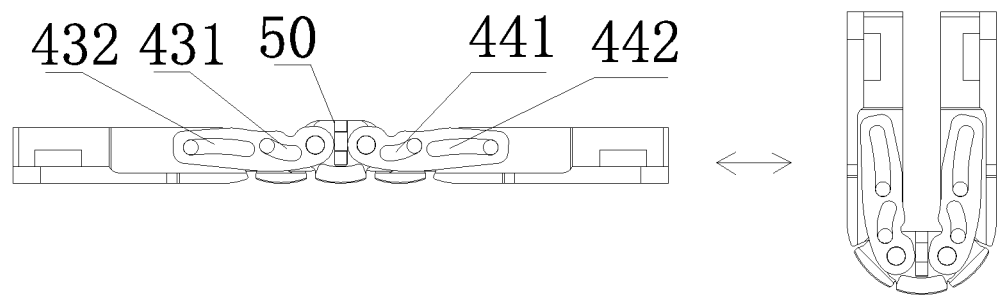
FIG. 3d is a working schematic diagram of a second guiding mechanism of the hinge shown in FIG. 2 when the hinge is bent and flattened.
Figure 4A:
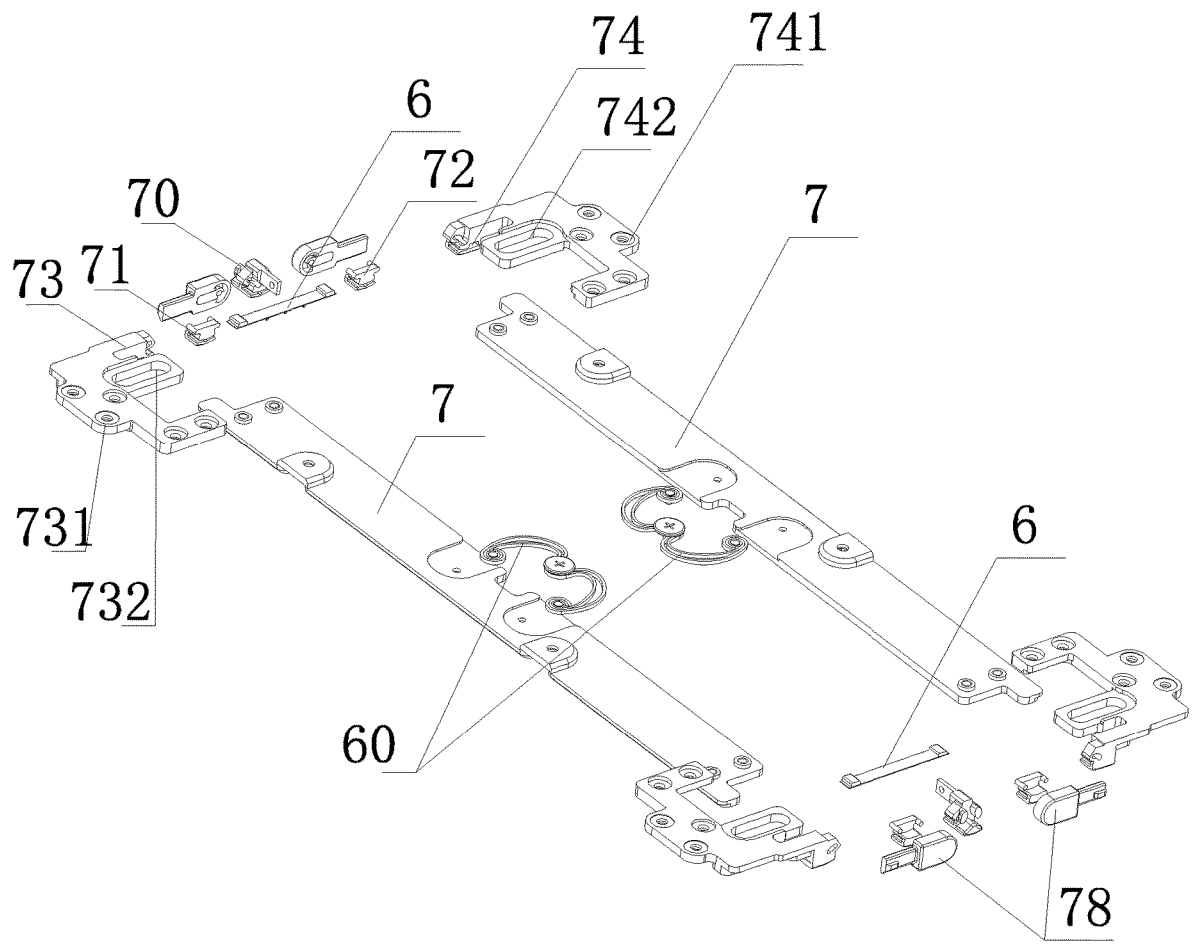
FIG. 4a is an exploded view of a neutral layer structure of the hinge shown in FIG. 2.
Figure 4B:
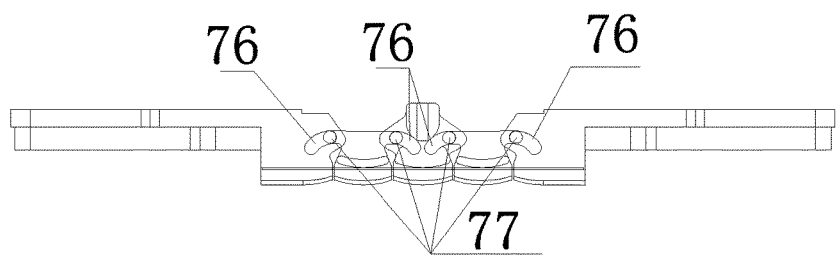
FIG. 4b is a cross-sectional view of a neutral layer structure of the hinge shown in FIG. 2.
Figure 4C:
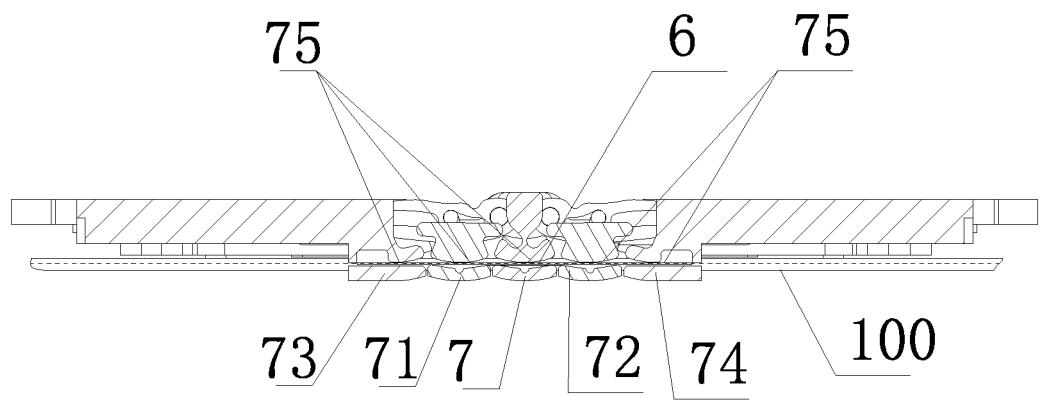
FIG. 4c is a schematic diagram of a corresponding end between a neutral layer structure and a flexible screen of the hinge shown in FIG. 2.
Figure 4D:
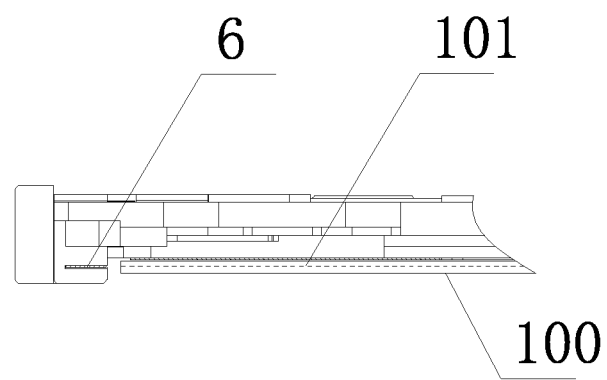
FIG. 4d is a stacked view of a corresponding side between a neutral layer structure and a flexible screen of the hinge shown in FIG. 2.
Figure 5:
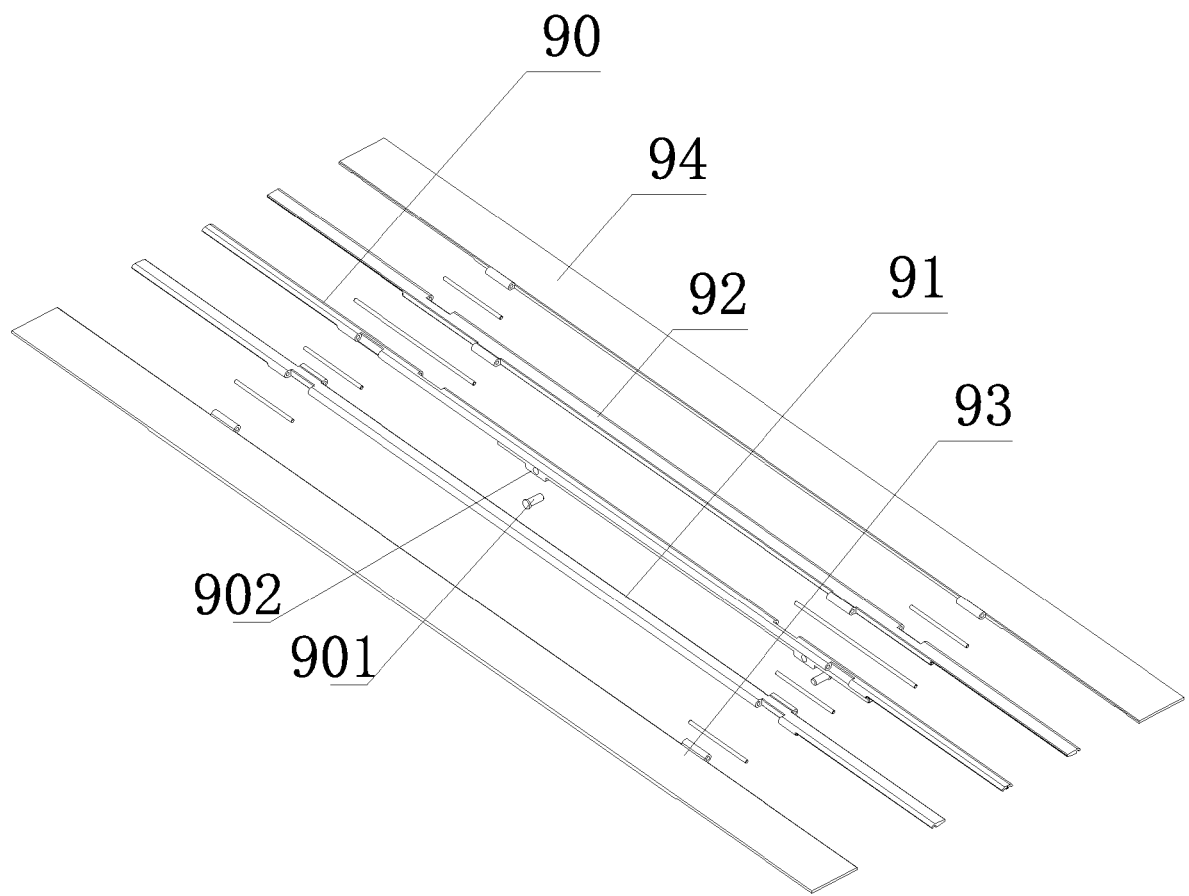
FIG. 5 is an exploded view of a decorative cover plate assembly of the hinge shown in FIG. 2.
Figure 6A:
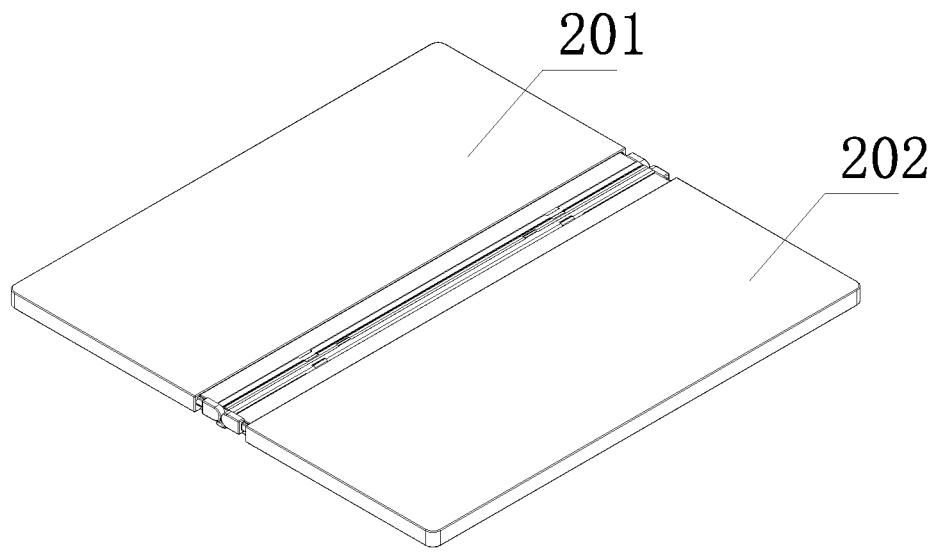
FIG. 6a is a schematic diagram of an embodiment of a mobile terminal having a flexible outer screen in an unfolded state.
Figure 6B:
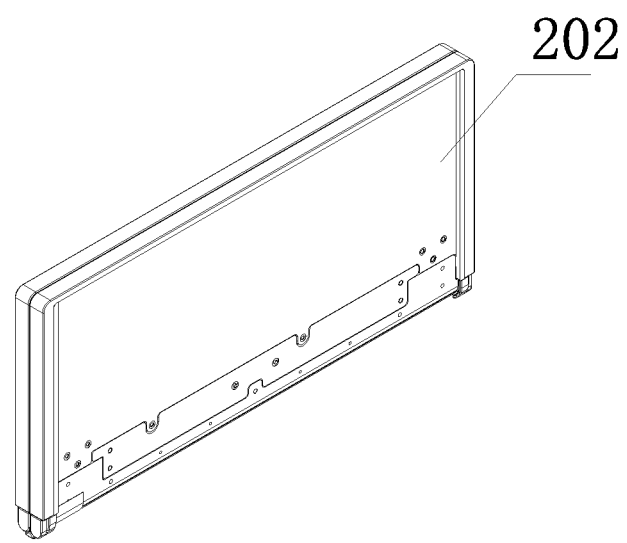
FIG. 6b is a schematic diagram of an embodiment of a mobile terminal having a flexible outer screen in a folded state.

Referring to the figures, the present invention is applied to a mobile terminal having a flexible outer screen. The flexible screen 100 is on the outside of the mobile terminal.

The hinge of a mobile terminal having a flexible outer screen provided in the present invention comprises a neutral layer structure that may be bent and unfolded and a bottom middle skeleton structure that may be bent and unfolded. The flexible screen supporting part of the bottom middle skeleton structure is under the flexible screen 100.

The flexible screen supporting part of the bottom middle skeleton structure comprises a middle support rod 1, a left auxiliary support rod 21, 31 and a right auxiliary support rod 22, 32. The number of auxiliary support rods on the left and right sides may vary according to needs. The middle support rod 1, the left auxiliary support rod 21, 31 and the right auxiliary support rod 22, 32 are positioned under the flexible screen. A flexible connecting sheet 4 is connected at the outer side of the middle support rod 1, the left auxiliary support rod 21, 31 and the right auxiliary support rod 22, 32. The main flexible connecting sheet 4 enables the middle skeleton to be flat when bending and flattening, and withstand the main tension and pressure when the hinge is bent and flattened. Since the main flexible connecting sheet is positioned below the flexible screen 100, its quantity and laying area can be unlimited, which can greatly enhance the service life of the hinge and the touch feel in the middle, and shares the force for the flexible part 6 of the neutral layer structure on both sides, so that the flexible part 6 of the neutral layer structure can be made thinner and narrower, which facilitates to achieve a narrow frame design. The flexible connecting sheet 4 can be a steel sheet or a plastic sheet, such as a PI sheet or similar flexible sheet with high Young modulus, etc.

The middle support rod 1, the left auxiliary support rod 21, 31, the right auxiliary support rod 22, 32, and the main flexible connecting sheet 4 constitute a middle skeleton of the hinge, which is positioned under the bottom of the flexible screen.

The two ends of the left auxiliary support rod 31 and the right auxiliary support rod 32 are respectively connected to the left and right ends of the synchronizing mechanism; the synchronizing mechanism may be a gear-driven synchronous reverse transmission mechanism or a cam-controlled synchronous reverse transmission mechanism, etc. The mounting frame body 50 of the synchronizing mechanism is connected to the middle support rod 1. In the present invention, the synchronizing mechanism adopts a gear transmission mechanism There are 2 meshed gears 51, 52 in total to facilitate the thinning design. If needed, 4 or more sequential meshed gears can be adopted. The gears 51, 52 are respectively provided with gear connecting arms 53 and 54, and the gear shafts 510 and 520 are both connected to the mounting frame body 50.

In order to simplify control and facilitate manufacturing, if there are a plurality of left auxiliary support rods, one of them can be connected to the synchronizing mechanism through the first guiding mechanism, and the remaining auxiliary support rods are driven and guided by connecting to the middle support rod and the auxiliary support rods that are connected to the synchronizing mechanism through the second guiding mechanism. It is similar to the right auxiliary support rod. The guiding fitting of the guiding device constituted by the two guiding mechanisms enables the left auxiliary support rod 21, 31 and the right auxiliary support rod 22, 32 to fit the shape change of the main flexible connecting sheet 4 and the flexible screen during the curvature bending process and the flattening process.

In this embodiment, the left auxiliary support rod 31 and the right auxiliary support rod 32 on the outer side are respectively provided with a non-linear first trajectory groove 41 at the connecting portions of the ends thereof. The gear connecting arms 53 and 54 are respectively provided with guide pins 42 that are inserted into the first trajectory groove 41 for connection and engagement to form a first guiding mechanism. The hinge is provided with a left guide 43 and a right guide 44 at the end of the middle skeleton structure, the left guide 43 and the right guide 44 are hinged with the middle support rod 1, and the left guide 43 and the right guide 44 are respectively provided with trajectory grooves 431, 432, 441, 442 for the left auxiliary support rods 21, 31 and right auxiliary support rods 22, 32. The left auxiliary support rods 21, 31 and the right auxiliary support rods 22, 32 are respectively provided with pins 211, 221, 311, 321 on the ends, and the pins are inserted into the corresponding trajectory grooves 431, 432, 441, 442 for connection and engagement, to form a second guiding mechanism.

The hinge can be provided with a torsion mechanism that plays a role of resistance, which can participate in or complete functions such as stopping rotation and positioning at any time, preventing the hinge from being closed, and increasing the hand feeling, etc. The torsion mechanism can be added on the synchronizing mechanism. The torsion mechanism includes a reed pipe 55. The reed pipe 55 can be connected to the mounting body 50 or to the middle support rod 1. The gear shafts 510 and 520 of the gears 51 and 52 pass through the respective reed pipe 55 and are clamped by the reed pipe 55. The torsion mechanism can also be disposed between other parts where a relative movement occurs.

The present invention is provided with a neutral layer structure and a bottom middle skeleton structure, and the two sides of the neutral layer structure are movably connected to the two sides of the middle skeleton, and abutted tightly by flexible components, such that the flexible part 6 in the neutral layer structure can only be subjected to tension without pressure. Thus, the burden of flexible part 6 in the neutral layer structure can be greatly reduced, making it thinner and narrower, to facilitate to realize the narrow frame design of the flexible screen.

The neutral layer of the flexible screen is corresponding to the middle position in the thickness direction of the flexible screen 100. The middle layer structure includes a flexible part 6 and a connecting structure at both ends of the hinge, the position of the flexible part 6 is outside the position where the hinge reserves for the flexible screen. The height of the flexible part in the thickness direction of the hinge is basically the same as the height of the neutral layer 101 of the flexible screen in the thickness direction when the flexible screen 100 is disposed on the hinge. The middle part of the connecting structure in the neutral layer structure is fixedly connected to the middle support rod 1, the left and right sides of the connecting structure in the neutral layer structure have connecting portions respectively, and the connecting portions on the left and right sides respectively have the connecting positions to connect the left and right casings 201, 202 of the mobile terminal. In addition, the connecting portions on the left and right sides are slidingly connected to the left and right sides of the bottom middle skeleton structure respectively (or movably connected by extending-retracting, rotating, etc.), to make up the change of relative position caused by the two layers of different heights during bending, and abutted tightly by flexible components. The force value of the flexible components is greater than the force value of the flexible part 6, such that the flexible part 6 can only be subjected to tension without pressure, thus, the flexible part can be made thinner, narrower, with improved service life. A connecting beam 7 under the flexible screen 100 is provided between the connecting structures at both ends, and the flexible components are connected between the connecting beam 7 and the bottom middle skeleton structure. In practical applications, the connecting portions on the left and right sides are connected to the left and right casings 201 and 202 of the mobile terminal respectively. Therefore, the flexible components can also be positioned between the casing (including the components in the casing) and the bottom middle skeleton structure; or, near the two ends of the hinge, flexible components are respectively provided between the left side of the neutral layer structure and the left side of the bottom middle skeleton structure, and between the right side of the neutral layer structure and the right side of the bottom middle skeleton structure.

In this embodiment, the connecting structure of the neutral layer structure includes a middle fixing part 70, a left connecting structure, and a right connecting structure. The middle fixing part 70 and the middle support rod 1 are fixedly connected, which can be integrated or separate but connected parts. The connection part of the middle fixing part 70 can be inserted into the slot 11 for fixing the mounting frame body 50 of the synchronizing mechanism at both ends of the middle support rod, and then fixed with screws or pins, similar to the connection method of the mounting frame body 50.

The number of the left connecting structure in the neutral layer structure can be one or more, as is the right connecting structure in the neutral layer structure. In this embodiment, the left connecting structure includes a first left connecting part 71 and a second left connecting part 73 that are disposed sequentially from the middle to the left side; the right connecting structure includes a first right connecting part 72 and a second right connecting part 74 that are disposed sequentially from the middle to the right side. Among them, the second left connecting part 73 and the second right connecting part 74 are respectively provided with connecting portions 731 and 741 that are connected with the left and right casings 201 and 202 of the mobile terminal, which can be connecting holes or parts where connecting holes are provided. The second left connecting part 73 and the second right connecting part 74 are further provided with a portion that is slidingly connected to the middle skeleton, which can be long holes 732 and 742 with guiding function, and the left auxiliary support rod 31 and the right auxiliary support rod 32 are respectively slidingly connected to the long holes 732 and 742 through pins or other connecting parts.

The middle fixing part 70, the first left connecting part 71, the second left connecting part 73 and the middle fixing part 70, the first right connecting part 72, the second right connecting part 74 are movably connected sequentially through the connecting structure of the trajectory groove 76 and the pin 77. The middle fixing part 70, the first left connecting part 71, the second left connecting part 73, the first right connecting part 72, the second right connecting part 74 are further connected to a flexible part 6. The flexible part 6 can be a thin and narrow sheet, or one or more thin strips, which may be steel sheets or plastic sheets, such as PI sheets and similar flexible sheets with high Young modulus, etc, or, metallic or non-metallic cables. The flexible part 6 enables the connecting structure of the neutral layer structure to be flat when bending and flattening, and move according to the fitting bending of the guiding mechanism of the middle skeleton, so that the connected casing and the bottom middle skeleton structure can be coordinated to adapt to the change of flexible screen when bending and flattening. The middle fixing part 70, the first left connecting part 71, the second left connecting part 73, the first right connecting part 72, the second right connecting part 74 are respectively provided with a groove 75 or a hole that is of basically the same size as flexible part 6, such that they can slide relatively and achieve the effect of the flexible sheet on the neutral layer structure.

In this embodiment, the flexible components can be a line spring 60, one side where the line spring 60 is positioned on the left and right sides of the hinge is connected to a beam 7 on the corresponding side, and the other side is connected to the left auxiliary support rod 31 and the right auxiliary support rod 32 respectively.

A decorative cover plate 78 can be provided on the outer side of the neutral layer structure, and the decorative cover plate is clamped with the trajectory groove 76 to shield these structures from the outside.

A decorative cover plate assembly 9 may be provided in the inner side of the hinge of the present invention. The decorative cover plate assembly 9 includes a middle connecting part 90, a first left rotating plate 91 and a first right rotating plate 92 in the middle, and a second left rotating plate 93 on the left side of the first left rotating plate 91, and the second right rotating plate 94 on the right side of the first rotating plate 92. The middle connecting part 90 and the middle support rod 1 are fixedly connected, and the connecting structure can be a pin 901 and pin holes 902, 903 on the middle connecting part 90 and the middle support rod 1. The left side of the middle connecting part 90, the first left rotating plate 91, the second left rotating plate 93 are rotatably connected sequentially, the right side of the middle connecting part 90, the first right rotating plate 92, the second right rotating plate 94 are rotatably connected sequentially, the second left rotating plate 93 and the second right rotating plate 94 are then movably connected to the left and right casings of the mobile terminal.

The foregoing description is only specific embodiments of the present invention, but the structural features of the present invention are not limited thereto. Any changes or modifications made by those skilled in the art of the present invention shall fall within the scope of protection of the present invention.

The invention claimed is:
1. A hinge of a mobile terminal having a flexible outer screen, comprising a neutral layer structure that may be bent and unfolded and a bottom middle skeleton structure that may be bent and unfolded; the middle part of the neutral layer structure is fixedly connected to the middle part of the middle skeleton structure, and left and right sides of the neutral layer structure are movably connected to the left and right sides of the middle skeleton structure respectively; and flexible components are respectively provided between the left side of the neutral layer structure and the left side of the middle skeleton structure and between the right side of the neutral layer structure and the right side of the middle skeleton structure;
  wherein the neutral layer structure comprises a middle fixing part, a left connecting structure, and a right connecting structure, a flexible part that is capable of bending and restoration along the bending shape and unfolding shape of the hinge is disposed on the neutral layer structure, the flexible part is connected to the middle fixing part, the left connecting structure and the right connecting structure, and the height of the flexible part in the thickness direction of the hinge is basically the same as the height of the neutral layer of the flexible screen in the thickness direction when the flexible screen is disposed on the hinge.

2. The hinge of a mobile terminal having a flexible outer screen according to claim 1, wherein the flexible components cause the flexible part to be pulled.

3. The hinge of a mobile terminal having a flexible outer screen according to claim 1, wherein the bottom middle skeleton structure comprises a middle support rod, a left auxiliary support rod, and a right auxiliary support rod, one or a plurality of main flexible connecting parts that are capable of bending and restoration along the bending shape and unfolding shape of the hinge are further disposed on the bottom middle skeleton structure, the main flexible connecting part is connected to the middle support rod, the left auxiliary support rod and the right auxiliary support rod; in the thickness direction of the hinge, the position of the main flexible connecting part is lower than the position of the flexible part.

4. The hinge of a mobile terminal having a flexible outer screen according to claim 1, wherein the bottom middle skeleton structure comprises a middle support rod, a left auxiliary support rod, and a right auxiliary support rod, and the middle support rod is fixed with a synchronizing mechanism, two ends of the left auxiliary support rod and the right auxiliary support rod are respectively connected to the left and right ends of the synchronizing mechanism, to make the left auxiliary support rod and the right auxiliary support rod to rotate synchronously and reversely along the left and right axes of the synchronizing mechanism.

5. The hinge of a mobile terminal having a flexible outer screen according to claim 4, wherein the left auxiliary support rod and the right auxiliary support rod are connected to the bottom middle skeleton structure through a guiding device.

6. The hinge of a mobile terminal having a flexible outer screen according to claim 5, wherein there are two left auxiliary support rods and two right auxiliary support rods respectively, the guiding device comprises a first guiding mechanism and a second guiding mechanism, the outer auxiliary support rods of the left auxiliary support rod and the right auxiliary support rod are respectively connected to two ends of the synchronizing mechanism through the respective first guiding mechanism; the two left auxiliary support rods are connected to the middle support rod through the second guiding mechanism thereof, and the two right auxiliary support rods are connected to the middle support rod through the second guiding mechanism thereof.

7. The hinge of a mobile terminal having a flexible outer screen according to 6, wherein the left auxiliary support rod and the right auxiliary support rod on the outer side are respectively provided with a non-linear first trajectory at the connecting portions of the ends, the synchronizing mechanism are provided with guide pins on the left and right ends respectively and the guide pins are inserted into the first trajectory groove of the left auxiliary support rod and the right auxiliary support rod for connection and engagement to form a first guiding mechanism; the hinge is provided with a left guide and a right guide at the end of the middle skeleton structure, and the left guide and right guide are hinged with the middle support rod, the left guide and the right guide are respectively provided with trajectory grooves for two left auxiliary support rods and two right auxiliary support rods, and the two left auxiliary support rods and the two right auxiliary support rods are respectively provided with pins on the ends, and the pins are inserted into corresponding trajectory grooves for connection and engagement, to form a second guiding mechanism.

8. The hinge of a mobile terminal having a flexible outer screen according to claim 4, wherein the synchronizing mechanism adopts a gear synchronizing mechanism, and the left gear and the right gear thereof are respectively provided with a connecting arm to connect to the left auxiliary support rod and the right auxiliary support rod.

9. The hinge of a mobile terminal having a flexible outer screen according to claim 1, wherein the left and right sides of the neutral layer structure are linearly and slidingly connected to the left and right sides of the middle skeleton structure.

10. The hinge of a mobile terminal having a flexible outer screen according to claim 1, wherein the neutral layer structure comprises a middle fixing part, a left connecting structure, and a right connecting structure, beams are respectively connected between the left connecting structures and between the right connecting structures at both ends of the hinge, and the flexible component are connected between the beam and the middle skeleton structure; or, near the two ends of the hinge, flexible components are respectively provided between the left side of the neutral layer structure and the left side of the middle skeleton structure and between the right side of the neutral layer structure and the right side of the middle skeleton structure; or, flexible components are respectively provided between the left side of the middle skeleton structure and the left casing of the mobile terminal and between the right side of the middle skeleton structure and the right casing of the mobile terminal.

11. The hinge of a mobile terminal having a flexible outer screen according to claim 1, wherein the left connecting structure and the right connecting structure are respectively provided with connecting portions of the left casing and the right casing of the mobile terminal having a flexible outer screen.

12. The hinge of a mobile terminal having a flexible outer screen according to claim 1, wherein the left connecting structure in the neutral layer structure comprises a first left connecting part and a second left connecting part that are disposed sequentially from the middle to the left side, and the right connecting structure comprises a first right connecting part and a second right connecting part that are disposed sequentially from the middle to the right side; the second left connecting part and the second right connecting part are provided with a connecting portion that is respectively connected to the left casing and the right casing of the mobile terminal, and the second left connecting part and the second right connecting part are further provided with a portion that is slidingly connected to the left and right sides of the middle skeleton structure respectively;

the middle fixing part, the first left connecting part, the second left connecting part, and the middle fixing part, the first right connecting part, and the second right connecting part are movably connected sequentially; the two ends of the flexible part are connected to the second left connecting part and the second right connecting part.

13. The hinge of a mobile terminal having a flexible outer screen according to claim 12, wherein the middle fixing part, the first left connecting part, the second left connecting part, the first right connecting part, and the second right connecting part are respectively provided with a groove or a hole to pass through the flexible part.

14. A mobile terminal having a flexible outer screen, wherein the mobile terminal is provided with a hinge of claim 1, and the left casing and the right casing of the mobile terminal having a flexible outer screen are respectively connected to the left and right sides of the neutral layer structure of the hinge.

* * * * *